US006140408A

United States Patent [19]
McCarthy et al.

[11] Patent Number: 6,140,408
[45] Date of Patent: Oct. 31, 2000

[54] ROOM TEMPERATURE COALESCABLE AQUEOUS FLUOROPOLYMER DISPERSIONS AND METHOD FOR THEIR MANUFACTURE

[76] Inventors: Thomas F. McCarthy, 169 Dafrack Dr.; Yan Chen, 39 Mara Rd., both of Lake Hiawatha, N.J. 07034; Peter Petersen, 133 Central Ave., New Providence, N.J. 07974

[21] Appl. No.: 09/208,527

[22] Filed: Dec. 9, 1998

Related U.S. Application Data

[62] Division of application No. 08/717,446, Sep. 20, 1996, Pat. No. 5,880,204
[60] Provisional application No. 60/004,397, Sep. 27, 1995, and provisional application No. 60/006,757, Nov. 15, 1995.

[51] Int. Cl.$^7$ .................................................. C09D 127/12
[52] U.S. Cl. ........................ 524/506; 524/504; 524/507; 524/508; 524/512; 524/520; 525/104; 525/108; 525/124; 525/125; 525/155; 525/194; 525/199; 525/244; 525/246; 525/261; 525/263; 525/276
[58] Field of Search ...................................... 525/194, 199, 525/244, 246, 261, 263, 276, 124, 125, 155, 104, 108; 524/504, 506, 507, 508, 512, 520

[56] References Cited

U.S. PATENT DOCUMENTS

| | | | |
|---|---|---|---|
| 4,036,802 | 7/1977 | Poirier | 260/296 |
| 4,469,846 | 9/1984 | Khan et al. | 525/72 |
| 4,631,326 | 12/1986 | Koishi et al. | 526/249 |
| 4,780,490 | 10/1988 | Mizuno et al. | 523/201 |
| 4,851,479 | 7/1989 | Blaise et al. | 525/276 |
| 4,904,726 | 2/1990 | Morgan et al. | 524/520 |
| 4,946,900 | 8/1990 | Blaise et al. | 525/276 |
| 4,952,630 | 8/1990 | Morgan et al. | 525/72 |
| 4,952,636 | 8/1990 | Morgan et al. | 525/276 |
| 5,057,575 | 10/1991 | Chapman, Jr. et al. | 525/199 |
| 5,059,480 | 10/1991 | Guerra et al. | 428/34.9 |
| 5,147,934 | 9/1992 | Ito et al. | 525/124 |
| 5,188,764 | 2/1993 | Shimizu et al. | 252/308 |
| 5,296,165 | 3/1994 | Shimizu et al. | 252/311 |
| 5,304,617 | 4/1994 | Kodama et al. | 526/255 |

*Primary Examiner*—Patricia A. Short
*Attorney, Agent, or Firm*—Roger H. Criss

[57] ABSTRACT

This invention relates to novel room temperature coalescable aqueous fluoropolymer dispersions and a process for their manufacture. These dispersions may be used in a variety of applications including high temperature thermoplastic coatings, polishes, room temperature formable paints and coatings, extrudable or injection moldable resins, and adhesives.

21 Claims, No Drawings

ROOM TEMPERATURE COALESCABLE AQUEOUS FLUOROPOLYMER DISPERSIONS AND METHOD FOR THEIR MANUFACTURE

This application is a divisional of application Ser. No. 08/717,446, filed on Sep. 20, 1996, now U.S. Pat. No. 5,880,204, which is a continuation-in-part of U.S. provisional application 60/004,397 filed on Sep. 27, 1995, and U.S. provisional application 60/006,757 filed on Nov. 15, 1995.

BACKGROUND OF THE INVENTION

This invention relates to novel room temperature coalescable aqueous fluoropolymer dispersions and a process for their manufacture. These dispersions may be used in a variety of applications including high temperature thermoplastic coatings, polishes, room temperature formable paints and coatings, extrudable or injection moldable resins, and adhesives.

Fluoropolymers are well known for their exceptional barrier properties, high temperature stability, chemical resistance, and weather resistance. However, the use of fluoropolymers based on tetrafluoroethylene ("TFE"), chlorotrifluoroethylene ("CTFE"), vinylidene fluoride ("VDF"), fluorinated ethylene-propylene ("FEP"), perfluorinated vinyl ethers, or perfluorinated acrylates in coating applications is limited as a result of the high temperatures required to fuse dispersions of these polymers onto various substrates.

Two well-known methods for preparing low temperature coalescable coatings incorporate either (1) non-crystalline or amorphous fluoropolymers which are dispersible in water; or (2) fluoropolymers which are soluble in organic solvents. These methods are not without their shortcomings. As disclosed for example in U.S. Pat. No. 4,631,326, the first type of fluoropolymer has low fluorine content, possesses poor barrier properties and undesirable weatherability characteristics. The costs incurred with handling large quantities of volatile organic chemicals ("VOC") make the second type of fluoropolymer unattractive. Moreover, when these polymers possess less than 40% by weight of fluoroolefin, their barrier, weatherability, and stain resistance properties are decreased, while their susceptibility to yellowing is increased. By contrast, when these polymers possess greater than 80% by weight of fluoroolefin, their solubility in common organic solvents, as well as their ability to polymerize with non-fluorinated olefins is reduced which leads to a low yield of low molecular weight product. Solvent-based fluoropolymers having a high solid content also suffer from an increased viscosity, which makes their processing and subsequent use as coatings more difficult. See U.S. Pat. No. 5,304,617. In addition, not only do many of these solvent-born fluoropolymers contain expensive comonomers such as cyclohexyl vinyl ether, but most of them swell in various solvents.

Methods for polymerizing core/shell fluoropolymer compositions are well-known in the art. See e.g., U.S. Pat. Nos. 4,952,636, 4,952,630, 4,904,726, 4,036,802, 4,780,490, 5,188,764 and 5,296,165. U.S. Pat. No. 4,469,846 describes a core/shell polymer containing a crystalline, non-elastomeric core of either TFE, VDF, or CTFE and an elastomeric copolymer shell of either VDF or TFE with HFP, TFE, perfluorinated alkyl ethers, or propylene. While these highly crystalline compositions (>50%) modify the physical properties and ease of processing of TFE-based resins, they are not designed to be coalescable at room temperature, nor is there a disclosure provided therein regarding methods for curing or crosslinking these compositions at room temperature. Room temperature coalescability is an important property for fluoropolymer dispersions used in applications such as coatings and/or paint applications since such dispersions have an economically-advantageous, reduced cycle time for curing which does not require the use of heat.

U.S. Pat. Nos. 4,851,479 and 4,946,900 disclose the polymerization of a shell of polyvinylidene fluoride ("PVDF") or copolymers thereof onto a CTFE-VDF copolymeric core in order to improve the mechanical flexibility properties over those of pure PVDF. However, although the resulting composition yields a high melting resin (160–170° C.) which, after processing possesses improved flexibility over that of pure PVDF, the composition disadvantageously does not possess low temperature coalescability.

The preparation of room temperature coalescable fluoropolymers, is not without its difficulties. It is desirable to incorporate into the fluoropolymer backbone a large quantity of a hydrophilic cure site provider such as 2-hydroxyethylacrylate in order to enhance mechanical properties after film formation. However, the copolymerization of hydrophilic olefins with hydrophobic fluoroolefins often leads to latex instability, causing coagulation. As described in Japanese Patent 228491 and European Patent 0675182A1, this problem can be overcome by conducting the polymerization in the presence of large quantities of nonionic and ionic surfactant. However, moisture sensitivity and chemical resistance are compromised by this process.

Therefore, there continues to be a need for water-based fluoropolymer dispersions capable of coalescing into continuous films at or below room temperature in the absence of large quantities of nonionic or anionic surfactants. A continuing need also exists for dispersions which: 1) possess a glass transition temperature low enough to allow for film formation when applied to a substrate while remaining stiff upon curing; 2) are solvent resistant after cure and non-tacky so that contaminants do not adhere to the resulting film; 3) are partially crystalline to impart adequate barrier properties, but flexible enough to undergo some mechanical deformation; and 4) have high enough fluorine content to provide acceptable weatherability.

DESCRIPTION OF THE INVENTION

The compositions of the invention are semicrystalline fluoropolymer compositions comprising a first copolymer which is semicrystalline and a second copolymer which is amorphous. The fluoropolymer composition is in the form of an aqueous dispersion containing spherical fluoropolymer particles. Generally particle sizes of from about 0.05 microns to about 1 micron having a weight average molecular weight of from about 10,000 to about 1,000,000 are obtained in this invention.

Although the morphology of the fluoropolymer particles is presumed to be two phase, that is a first phase composed predominantly of the first copolymer, and a second phase composed predominantly of the second copolymer, no direct proof of this morphology can be obtained due to the chemical nature of the polymer. However, based upon the process by which the compositions are prepared, and the properties they exhibit (room temperature coalescence), we believe that the second copolymer envelops the first. It is not known: whether the first and second copolymer compositions are continuous or discontinuous; where the domains of each copolymer composition are located in the spherical particles; or whether the second copolymer completely encapsulates the first copolymer. It is known in the art, that when a polymer composition is prepared using a two step polymerization process, a wide variety of polymer morphologies are possible.

In accordance with this invention, there is provided a semi-crystalline polymeric composition comprising:

a) a semi-crystalline first copolymer having at least two comonomer units of the formula

CX$_2$CYA wherein
X is independently selected from H, Cl, or F;
Y is H, Cl, F, O(CZ2)$_n$CZ$_3$, (CZ$_2$)$_n$CZ$_3$, (OCZ$_2$CZ$_2$)$_n$CZ3, or (O(CZ2)$_n$)$_n$CZ$_3$ wherein n is from about 1 to about 12;
Z is independently selected from H or F;
A is H, Cl, or F;
the first copolymer contains at least about 4 weight percent of each of the comonomer units; and
at least one of the first comonomer units contains a fluorine atom; and b) an amorphous second copolymer having at least two comonomer units of the formula

CX$_2$CYB wherein
X and Y are as defined above;
B is H, Cl, F or —OCOR; wherein R is a linear or branched aliphatic hydrocarbon of from 1 to 20 carbons
at least one of the second comonomer units contains a fluorine atom; and c) at least one cure site provider.

The invention also relates to a process for producing a semicrystalline polymeric composition comprising:

a) reacting, in the presence of radical initiator,
1) at least two comonomer units of the formula

CX$_2$CYA wherein
X is independently selected from H, Cl, or F;
Y is H, Cl, F, O(CZ2)$_n$CZ$_3$, (CZ$_2$)$_n$CZ$_3$, (OCZ$_2$CZ$_2$)$_n$CZ3 or (O(CZ2)$_n$)$_n$CZ$_3$ wherein n is from about 1 to about 12;
Z is independently selected from H or F;
A is H, Cl, or F;
the first copolymer contains at least about 4 weight percent of each of the comonomer units;
at least one of the said comonomer units contains a fluorine atom;
under conditions sufficient to form a semicrystalline first copolymer;

b) reacting, in the presence of said first copolymer, water, a radical initiator, at least one cure site provider, and at least two comonomer units of the formula:

CX$_2$CYB

X and Y are as defined above;
B is H, Cl, F or —OCOR wherein R is a linear or branched aliphatic hydrocarbon of from 1 to 20 carbons
at least one of said comonomer units contains a fluorine atom;
under conditions sufficient to form a semi-crystalline polymeric composition.

For purposes of this invention, the term "copolymer" means a polymer having at least two monomeric units. "Semi-crystalline" means a composition having both crystalline and amorphous domains wherein the crystalline domains range from about 1 to about 45 weight percent and preferably from about 10 to about 30 weight percent of the composition and the amorphous domains range from about 99 to about 55 weight percent and preferably from about 70 to about 90 weight percent of the composition. "Amorphous" means a composition having from about 0 weight percent crystallinity.

All of the materials used to make the first and second copolymers of the invention are commercially available. The first copolymer is a semicrystalline material and has a glass transition temperature of from about 0° to about 150° C. and preferably from about 40° to about 100° C. Suitable comonomer units from which this copolymer may be made include: partially and perfluorinated olefins such as chlorotrifluoroethylene (CTFE); vinylidene fluoride (VDF); tetrafluoroethylene (TFE); hexafluoropropene (HFP); 1,2-difluoroethylene; 1,2-chlorodifluoroethylene; 1-chloro-1-fluoroethylene and fluorinated alkyl alpha olefins; perfluoroethers such as perfluoro(propyl vinyl ether); perfluorodioxoles such as perfluoro(1,3-dioxole) and perfluoro(2,2-dimethyl-1,3-dioxole); olefins such as ethylene, propylene and isobutylene; and vinyl esters such as vinylpropionate. At least one comonomer must include a fluorine atom. In a more preferred embodiment, the monomer units used to make the first copolymer have the formula: CX$_2$CYA wherein X, Y and A are as defined above excluding monomers in which each X and A are hydrogen and olefins containing more than one chlorine atom, provided at least one comonomer unit contains a fluorine atom. In a more preferred embodiment, the comonomers used to make the first copolymer are CTFE and VDF.

The amount of each monomeric unit used to prepare the first copolymer will depend to a great extent on the identity of the monomers selected and the way in which each monomer unit is incorporated into the polymer backbone (e.g., random vs. block). In the case of fluoropolymers, generally, increasing levels of comonomer leads to decreasing levels of crystallinity. One skilled in the art can readily and without undue experimentation optimize these ranges to obtain a semicrystalline fluoropolymer composition within the scope of the invention. When the first copolymer is comprised of CTFE and VDF, VDF is present in an amount of at least about 4 weight percent, preferably at least about 6 weight percent and most preferably from about 6 to about 10 weight percent of the first copolymer. When the first copolymer is comprised of TFE and HFP, the HFP is present in an amount of from about 5 to about 15 weight percent of the first copolymer. When the monomeric units which comprise the first copolymer are TFE and propylene, the propylene component is present in an amount of from about 5 to about 15 weight percent. When the monomeric units which comprise the first copolymer are CTFE and vinyl acetate, the vinylacetate is present in an amount of from about 3 to about 20 weight percent of the first copolymer.

When the monomeric units which comprise the first copolymer are ethylene and propylene the propylene is present in an amount of from about 1 to about 30 weight percent of the first copolymer. When the first copolymer is comprised of monomeric units of TFE, HFP and VDF, the weight percent of HFP and VDF totals from about 5 to about 20 weight percent and of this amount, HFP represents from about 1 to about 16 weight percent.

The second copolymer is amorphous and has a glass transition temperature of from about −50° C. to about 60° C., preferably from about 10° C. to about 60° C., and more preferably from about 20° C. to about 60° C. Suitable comonomers from which the second copolymer composition may be prepared include: partially and perfluorinated olefins such as CTFE; VDF; TFE; HFP; 1,2-difluoroethylene; 1,2-chlorodifluoroethylene, 1-chloro-1-fluoroethylene and 3,3,4,4,4-pentafluoro-1-butene; perfluoroethers such as perfluoro(propyl vinyl ether); perfluorodioxoles such as perfluoro(1,3-dioxole) and perfluoro(2,2-dimethyl-1,3-dioxole); olefins such as ethylene, propylene and isobutylene; and vinyl esters such as vinyl propionate. At least one of the comonomers must contain a fluorine atom. In a more preferred embodiment, the comonomers used to make the second copolymer are selected from CTFE, VDF, a fluorinated alpha olefin, and/or a vinyl ester such as vinyl propionate and vinyl butyrate. In a more preferred embodiment the comonomers have the formula: $CX_2CYA$, wherein X, Y and A are as defined above, excluding olefins in which each X and A are hydrogen and olefins containing more than one chlorine atom and provided that at least one comonomer unit used to make the second copolymer contains a fluorine atom. In a more preferred embodiment, the comonomers used to make the second copolymer are CTFE and VDF.

The amount of each monomeric unit used to prepare the second copolymer will depend to a great extent on the application in which the material will be used (e.g., a room temperature application generally requires a composition with a glass transition temperature close to room temperature). In the case of fluoropolymers, generally, increasing levels of comonomer leads to decreasing glass transition temperatures. One skilled in the art can readily and without undue experimentation optimize these ranges to obtain an amorphous fluoropolymer composition having the desired properties.

When the comonomers used to make the second copolymer are VDF and CTFE, the VDF is present in an amount of from about 15 to about 60 weight percent, preferably from about 20 to about 50 weight percent and most preferably from about 25 to about 40 weight percent of the second copolymer. When the comonomers used to prepared the second copolymer are CTFE, VDF and a vinyl ester, the vinyl ester is present in an amount of from about 1 to about 20 weight percent and preferably from about 5 to about 15 weight percent of the second copolymer, the CTFE component is present in an amount of from about 50 to about 80 weight percent and the VDF is present in an amount of from about 15 to about 45 weight percent. When VDF and HFP are the monomeric units which comprise the second copolymer, the HFP component is present in an amount of from about 25 to about 50 weight percent of the second copolymer. When the second copolymer is a terpolymer of TFE, HFP and VDF, the HFP and VDF components total from about 25 to about 50 weight percent and within this segment, the VDF is present in an amount of from about 10 to about 40 weight percent. When the second copolymer is a copolymer of ethylene and propylene, the propylene is present in an amount of from about 50 to about 70 weight percent of the second copolymer. When the monomer units which comprise the second copolymer are CTFE and vinylcaproate, the vinylcaproate is present in an amount of from about 30 to about 60 weight percent of the second copolymer.

The choice of cure site provider is application dependent. For example, when formulating floor polishes, cure site providers which contain carboxylic acid functionality are preferred because they readily crosslink with agents found in current industrial formulations. Cure site providers useful in the invention include olefins having from about 1 to about 10 carbon atoms and containing at least one hydrophillic functional group attached to the backbone of the olefin. Any hydrophillic functional group(s) may be used. Examples of suitable functional groups include —$CO_2H$; —OH; —NH; other nitrogen containing organic functional groups, —SH; ester, urethane, and isocyanate groups. These functional groups: act as room temperature curing sites for crosslinking during particle coalescence; impart stability, in some cases, to the water-based latex by protruding into the aqueous phase; act as a dispersing aid by lowering the surface energy of the aqueous dispersion; and contribute to the lowering of the minimum film formation temperature by promoting swelling of the latex in water. Examples of such cure site providers include: vinyl acetic acid ("VAA"); 3-hydroxypropylacrylate; 2-hydroxyethylacrylate; itaconic acid ("ITA"); cinnamic acid ("ITA"); fumaric acid; any n-hydroxyalkyl vinyl ether such as 2-hydroxyethyl vinyl ether ("HEVE"); any n-hydroxy alkyl allyl ether such as 4-hydroxybutyl allyl ether; 2-acrylamido-2-methylpropanesulfonic acid (AMPS); crotonic acid; 3-allyloxypropionic acid; acrylic acid; maleic acid; methacrylic acid; vinylphthalic acid and mixtures thereof. Vinyl esters are also suitable cure site providers for the applications of the invention when crosslinked with suitable organic compounds such as aziridines. Other suitable crosslinking agents will readily occur to those skilled in the art. Disuccinic acid peroxide a known polymerization initiator which may also function as chain transfer agent will also provide carboxylic acid cures sites. Acrylic acid, methacrylic acid, 2-hydroxypropylacrylate and 3-hydroxypropylacrylate are the preferred cure site providers.

Generally, the cure site provider is present in an amount of less than about 20 weight percent, preferably less than about 10 weight percent and more preferably less than about 5 weight percent of the final semicrystalline polymer composition.

Depending upon the comonomer units and cure site provider selected, the second copolymer may possess one of the following structures: 1) low crystallinity such that it readily deforms upon film formation to form a continuous film at elevated temperatures; 2) amorphous, yet non-elastic at room temperature; 3) amorphous with zero crystallinity and elasticity; or 4) amorphous with up to about 15 weight percent crystallinity, yet film-formable upon the addition of suitable coalescing agents, plasticizers, or other macromolecules.

The first copolymer is present in an amount from about 5 to about 80 weight percent, and preferably from about 50 to about 80 weight percent based upon the total weight of the overall semicrystalline polymer composition while the second copolymer is present in an amount of from about 20 to about 95 weight percent, and preferably from about 20 to about 50 weight percent based upon the total weight of the overall semicrystalline polymer composition.

The solvent resistance and mechanical properties of the overall polymer composition may be improved by including during polymerization a multifunctional comonomer crosslinking agent in the first copolymer composition which lightly crosslinks the first copolymer. Suitable crosslinking agents include: acrylates such as allylmethacrylate, ethyleneglycol dimethacrylate, trimethylolpropane triacrylate; dienes such as divinylbenzene, 1,3-butadiene, 1,3-butadiene hexafluoride, isoprene, chloroisoprene, 1,4-pentadiene, 1,7-octadiene ("OD"), and 1,5-hexadiene; ethers such as ethylene glycol divinyl ether, perfluorinated or partially perfluorinated analogues, copolymers and mixtures thereof. When these crosslinking agents are used, they are generally present in an amount of from about 0.1 to about 5 weight percent and preferably from about 0.5 to about 3 weight percent of the first copolymer composition. In a more preferred embodiment, the lightly crosslinked first copolymer has a glass transition temperature greater than about 50° C., and more preferably greater than 100° C.

Any commercially available radical initiator may be used in the present invention. Suitable candidates include: thermal initiators and oxidation-reduction or "redox" initiator systems. Thermal initiators include: metal persulfates like potassium persulfate and ammonium persulfate; organic peroxides or hydroperoxides such as diacyl peroxides, ketone peroxides, peroxyesters, dialkyl peroxides, and peroxy ketals; azo initiators such as 2,2'-azobisisobutyronitrile and water soluble analogues thereof and mixtures of any of the foregoing. Any redox initiator system known to be useful in the preparation of fluoropolymers such as PCTFE may be used in the present invention. Typical redox initiator systems comprise: 1) an organic or inorganic oxidizing agent or mixtures thereof; and 2) an organic or inorganic reducing agent or mixtures thereof. Suitable oxidizing agents include metal persulfates such as potassium persulfate and ammonium persulfate; peroxides such as hydrogen peroxide, potassium peroxide, ammonium peroxide, tertiary butyl hydroperoxide ("TBHP")($(CH_3)_3COOH$), cumene hydroperoxide, and t-amyl hydroperoxide; manganese triacetate; potassium permanganate; ascorbic acid and mixtures thereof. Suitable reducing agents include sodium sulfites such as sodium bisulfite, sodium sulfite, sodium pyrosulfite, sodium-m-bisulfite ("MBS") ($Na_2S_2O_5$), and sodium thiosulfate; other sulfites such as ammonium bisulfite; hydroxylamine; hydrazine; ferrous iron; organic acids such as oxalic acid, malonic acid, and citric acid and mixtures thereof. The preferred free radical initiating system is one that serves to simultaneously emulsify the polymer while initiating the polymerization, thus eliminating the need for large quantities of surfactants. Redox initiator systems are the preferred radical initiator for the invention.

Preferred redox initiator systems use a MBS reducing agent and a TBHP oxidizing agent. In a more preferred embodiment, the redox-initiator system is used in conjunction with a transition metal accelerator. Accelerators can greatly reduce the polymerization time. Any commercially available transition metal may be used as an accelerator in the invention. Preferred transition metals include copper, silver, titanium, ferrous iron, and mixtures thereof. Ferrous iron is most preferred.

The amount of radical initiator used in the process depends on the relative ease with which the various monomers copolymerize, the molecular weight of the polymer and the rate of reaction desired. Generally, from about 10 to about 100,000 ppm of initiator may be used, although from about 100 to about 10,000 ppm is preferred.

Optionally, in order to further accelerate the polymerization, the redox initiator system may include additional peroxide-based compounds. The amount of additional peroxide-based compound used ranges from about 10 to about 10,000 ppm and preferably from about 100 to about 5000 ppm.

The radical initiator may be added before, simultaneously with and/or shortly after the addition and/or consumption of the monomers used to make the first copolymer. When an additional peroxide-based compound is used it may be added at the same intervals specified for the primary radical initiator.

The semicrystalline fluoropolymer compositions of the invention may be made by a two step polymerization reaction. In its most simplified form, monomers, water and an initial charge of radical initiator are introduced into a suitable polymerization vessel. Additional monomer is added throughout the reaction at a rate equal to the rate of consumption to maintain a constant pressure. Incremental additional charges of initiator are introduced into the vessel over the duration of the reaction to sustain the polymerization. Preparation of the second copolymer is accomplished by changing the feed ratio of monomers (where the same monomers are used to make the second copolymer) and/or charging other monomers. The reaction mixture is maintained at a controlled temperature while all reactants are being charged to the vessel and throughout the polymerization reaction.

The only requirement for the reaction vessel used to prepare the compositions of the invention is that it be capable of being pressurized and agitated. Conventional commercially available autoclave which can be sealed and pressurized to the required reaction pressures (preferably in excess of 3.36 MPa (500 psig) for safety considerations) are preferred. Horizontally inclined autoclaves are preferred to vertically inclined autoclaves, although both geometry's can be used.

The aqueous medium in which the polymerization is conducted is deionized, nitrogen purged water. Generally, an amount equivalent to approximately half the capacity of the autoclave is used. The ratio of polymer to water is chosen in such a way to obtain a dispersion of from about 20 to about 70% polymer solids in water. The water is precharged to the autoclave.

The monomers may be charged to the reactor vessel either in a semicontinuous or a continuous manner during the course of the polymerization. "Semi-continuous" means that a number of batches of the monomers are charged to the reactor during the course of the polymerization reaction. The batch size is determined by the desired operating pressure. In a preferred embodiment, about 85% to about 95% of the total weight of the monomers used to create the first copolymer are consumed in the reactor vessel before the monomers used to create the second copolymer are charged. The molar ratio of total monomer consumed to radical initiator will depend upon the overall particle size and molecular weight desired. Preferably, the overall mole ratio of monomer to initiator will be from about 10 to about 10,000, more preferably from about 50 to about 1000, and most preferably from about 100 to about 500 moles of total monomer to 1 mole of initiator.

The radical initiator is generally added incrementally over the course of the reaction. For purposes of this discussion, "Initial Charge" or "Initial Charging" of initiator refers to a rapid, large, single or incremental addition of initiator to effect the onset of polymerization. In the Initial Charge, generally, between about 10 ppm/min to about 1000 ppm/min is added over a period of from about 3 to about 30 minutes, either before, after, or during the charging of the monomers to make the first copolymer. "Continuous Charge" or "Continuous Charging" means the slow, small, incremental addition of initiator over a period of from about 1 hour to about 6 hours or until polymerization has concluded. In the continuous charge generally between about 0.1 ppm/min to about 30 ppm/min of initiator is added.

During the initiation of the polymerization reaction, the sealed reactor and its contents are maintained at the desired reaction temperature, or alternately to a varying temperature profile which varies the temperature during the course of the reaction. Control of the reaction temperature is another important factor for establishing the final molecular weight of the fluoropolymers produced. As a general rule, polymerization temperature is inversely proportional to produce molecular weight. Typically, the reaction temperature should range between about 0° C. to about 120° C., although temperatures above and below these values are also contemplated. The reaction pressure is preferably between from about 172 KPa to about 5.5 MPa, and more preferably from about 345 KPa to about 4.2 MPa. Elevated pressures and temperatures will yield greater reaction rates.

The polymerization must be conducted under agitation to ensure proper mixing. An adjustment of the agitation rate during the respective polymerization may be necessary to prevent premature coagulation of the particles. Although the agitation rate and reaction time will typically depend upon the amount of fluoropolymer product desired, one of ordinary skill in the art can readily optimize the conditions of the reaction without undue experimentation to get the claimed results. The agitation rate will generally be in the range of from about 5 to about 800 rpm and, preferably from about 25 to about 700, depending on the geometry of the agitator and the size of the vessel. The reaction time will generally range from about 1 to about 24 hours, and preferably from about 1 to about 8 hours.

The fluoropolymers produced using the above surfactant free process are self-emulsifyable fluorinated macromolecules having inorganic, "surfactant-like" functional end groups which impart excellent latex stability to the polymer when these end groups are present in very low concentration. The fluoropolymers produced are thereby dispersed in the aqueous medium by the attachment of these inorganic fragments onto the end of the polymer repeating units, thus creating a surface active agent having both a hydrophobic component and a hydrophilic component. This attachment leads to micelle formation, or, if the concentration of functionalized end groups is high enough, to their complete dissolution in water.

The type of "surfactant like" end groups produced depends upon the type of initiator system selected, the optional addition of functionalized monomers such as acrylic acid, and the optional addition of compounds which might be incorporated into the polymer through chain transfer reactions, i.e. disuccinic acid peroxide at low temperatures. Examples of such emulsifying functional end groups include, but are not limited to, sulfonates, carboxylates, phosphonates, phosphates, and salts and acids thereof; ammonium salts; and any mixtures thereof.

The presence of sulfonic acid end groups most significantly affect the emulsification of the fluoropolymers in water. The amount of these functional end groups in the dispersion can be determined by first purifying the dispersion by methods known to the art, such as by ion-exchange or dialysis, titrating the dispersion with any known base such as aqueous sodium hydroxide or ammonium hydroxide, and then expressing the amount in terms of molar equivalents of titrated base. The amount of these functional end groups expressed in moles of equivalent NaOH may range between from about 0.0001 to about 0.5 moles of functional end groups per liter of fluoropolymer dispersion obtained. The molar ratio of these functional end groups:fluoropolymer produced may range from about 1:10 to 10,000, preferably from about 1:10 to 1000, and more preferably from about 1:50 to 500. A typical fluoropolymer dispersion within the scope of this invention contains about 0.01 molar equivalents/kg of dried polymer.

In the absence of added surfactant, the resulting particle distribution of the dispersion produced according the process of the invention will be monodisperse and narrow. By "monodisperse distribution", as used herein means a single distribution of particle sizes. Generally, the particle distribution ranges between about 0.1 microns and about 0.4 microns, and more preferably from about 0.1 to about 0.3 microns.

Although a stable aqueous dispersion of fluoropolymer particles can be obtained in the absence of any added dispersants, any commercially available surfactant may optionally be pre-charged or added batchwise during or subsequent to the onset of polymerization to further manipulate particle size, particle number and particle distribution. It is well known for typical surfactant containing emulsion polymerizations that the addition of additional surfactants during the course of polymerization to emulsions already containing surfactants sometimes creates new particles and thus produces a bimodal distribution of particles or a broad distribution of particles.

Suitable surfactants will readily occur to those skilled in the art and include anionic, cationic, or nonionic surfactants. Preferred surfactants include: perfluorinated anionic and nonionic surfactants. Examples of suitable perfluorinated anionic surfactants include perfluorinated ammonium octanoate, perfluorinated alkyl/aryl ammonium (metal) carboxylates and perfluorinated alkyl/aryl lithium (metal) sulfonates wherein the alkyl group has from about 1 to about 20 carbon atoms. Other suitable surfactants include fluorinated ionic or nonionic surfactants; hydrocarbon based surfactants such as the alkylbenzenesulfonates, or mixtures of any of the foregoing. Perfluorinated anionic surfactants most preferred.

The fluoropolymers produced by the process of the invention may be isolated by conventional methods such as evaporating the water medium; freeze-drying the aqueous suspension; or adding a minor amount of an agglomerating or coagulating agent such as ammonium carbonate, followed by filtration or centrifuging. Alternatively and preferably the fluoropolymer dispersion produced is used AS IS.

When formulating the dispersion for various applications such paints, coatings and adhesives, it may be desirable to include additional components such as: internal and external coalescing agents like (di)ethylene glycols alkyl ethers like ("butyl carbitol"); wetting and leveling agents such as octylphenoxypolyethoxyethanol; pigments such as titanium dioxide; thickeners such as hydrophobe modified alkali swellable emulsions (HEURASE); defoamers; UV absorbers; plasticizers such as butylbenzyl phthalate; biocides, and the like. See e.g. Handbook of Organic Coatings: A Comprehensive Guide for the Coatings Industry, (NY 1990) or Handbook of Coatings Additives, (NY 1987).

Curing agents, organic and inorganic, are another class of post polymerization additive that may be used during formulation to improve mechanical properties of final product. They may be used alone (i.e., organic or inorganic) or in combination (i.e., organic and inorganic). Any commercially available curing agent may be used. Suitable organic curing agents include, but are not limited to: isocyanates such as hexamethylenediisocyanate, blocked isocyanates, polyisocyanates, biurets, uretidiones; amino resins such as melamine and urea; acid anhydrides such as succinnic anhydride; polysilanes such as dimethyldimethoxysilane, blocked silanes such as oxime- or alkoxy-blocked silanes; polyfunctional aziridine liquid crosslinkers such as aliphatic trifunctional aziridines; aliphatic and aromatic carbodiimides; polyepoxy compounds; isocyanate-containing silane compounds; hydroxylamines, and copolymers and mixtures thereof.

Suitable inorganic curing agents include: metallic curing agents such as compounds containing transition metals such as zinc or zirconium which form ionomeric crosslinks or clusters with the copolymerized cure site provider; transition metal-containing alkyl oxides wherein the alkyl group has from about 1 to about 6 carbon atoms; acetates such as zinc acetate, acetylacetonates such as zinc acetylacetonate; oxides such as zinc oxide; and carbonates such as zinc ammonium carbonate; and mixtures thereof. Compounds containing zinc and zirconium compounds are most preferred because their salts are white or colorless.

Resins, formed by isolating the fluoropolymer compositions of the invention may be used ultimately to manufacture or form a variety of articles by using conventional processing techniques. By way of example, not by limitation, the fluoropolymer resins may processed using any of the following methods: conventional extrusion techniques [e.g., for the formation of fibers, strands, pellets, formed profile shapes, films, sheets, and plates (See Poirier, U.S. Pat. No. 4,036,802 and Khan et. al., U.S. Pat. No. 4,469,846)]; blown film methods; casting techniques wherein a billet of the fluoropolymer resin is formed and an ultimate article is cut or profiled or otherwise derived from the billet, such as skiving film therefrom; and injection and compression molding techniques.

The product of the polymerization process of the invention may be used unaltered, that is in its aqueous dispersion form, in a number of applications. The dispersion may be used as an additive for: polishes (See Gehman, U.S. Pat. No. 4,150,005 which disclosure is incorporated herein); concrete (adds moisture barrier properties); sunscreens, paints (binder for color), and inks (adds lubricity); protective coatings for metals (See Morgan et. al., U.S. Pat. No. 5,344,867 which disclosure is incorporated herein) fabrics, multilayer film structures (See Effenberger et. al., U.S. Pat. No. 5,141,800 which disclosure is incorporated herein), and original equipment manufactured goods ("OEM"). Examples of OEM applications include, but are not limited to, coatings for vehicles (for air, land and sea) and appliances such as outdoor refrigeration units and machinery. The dispersions may also have application as deicing agents for aircraft. Methods for formulating aqueous dispersion in these applications are known to those skilled in the art.

In general, coatings comprised of the dispersion of the invention are advantageous in any application where resistance to salt, water, fuels, solvents acids, bases, bacteria, barnacles, pollutants, cleaning solutions, i.e. surfactants, is desired. Coatings which use the compositions of the invention possess a strong adhesion to plastics such as nylon-6, polyimide, polycarbonate, polystyrene, polyester, and the like. The coatings also possess a low coefficient of friction which enables their use as a release coating for non-stick applications, i.e., antigrafitti applications. Further, due to their low emissions in the infrared spectrum, coatings containing the dispersions are also useful in applications where detection by infrared spectroscopy is desired.

Depending on the application and desired properties, it may be advantageous to blend the polymer of the invention with other polymeric materials. Examples of other polymers include, but are not limited to, acrylate polymers and copolymers thereof such as polybutyl or polyethyl acrylate; polyethylene-acrylic acid copolymers, polyacrylamide; polyethers such as polyetheretherketone ("PEEK"); polymethylmethacrylate ("PMMA"); polyethylmethacrylate; copolymers containing various substituted acrylates and/or acrylic acid; copolymers or mixtures thereof (See Martinez-Salazar et. al., Journal of Materials Science, 26, 1991, 2579–2582.)

The invention is more readily understood by reference to the following examples. Monomer charges used in Examples 1–5 are reported in Table I below.

EXAMPLE 1

Preparation of Fluoropolymer Dispersion of CTFE, VDF and Acrylic Acid, A Cure Site Provider The first example is directed to the preparation of a fluoropolymer dispersion for a floor polish application. A 3.8 liter stainless steel autoclave is charged with 1400 ml of deionized water then nitrogen sparged. After the autoclave is sealed, it is pressurized with 235 g of CTFE and 15 g VF2. The temperature is then raised to 43C, yielding a pressure of 194.2 psi (1.34 GPa).

Over a ten minute period, two streams of redox catalysts are injected separately into the autoclave: (1a) 1.0 g MBS and 0.5 iron (II) sulfate heptahydrate diluted to 50 ml with deionized, (DI), deoxygenated water; and (2a) 1.2 g of a 70% TBHP solution diluted to 50 ml with DI, deoxygenated water. This rapid charging is the Initial Charge of initiator. After the 10 minute period, additional redox catalyst is then injected over a six hour period at 0.33 ml/min: (1b) 3.49 g MBS diluted to 100 ml with DI water; and (2b) 4.58 g of a 70% solution (aq) diluted to 100 ml. This slow charging of dilute polymerization initiator is referred to as the Continuous Charge of initiator.

After consumption of the first charge of CTFE and VF2, an additional charge of 235 g CTFE, 15 g VF2 is added. After 71 minutes of polymerization the pressure reached 88.4 psi (0.61 GPa). The autoclave was then recharged with 126 g CTFE and 126 g VF2 (3rd charge of monomer), the temperature increased to 120C yielding a pressure of 553 psi (3.81 GPa). After the pressure had dropped to 263 psi (1.81 GPa), the autoclave was charged with 63 g CTFE, 63 g VF2 (4th charge). During consumption of the 3rd and 4th charges, a solution of 9.3 g acrylic acid, and 0.5 g of Triton 15-S-12, diluted to 100 ml with DI, deoxygenated water, was pumped continuously at a rate proportionate to the rate of consumption of the 3rd and 4th monomer charges. Overall reaction time was 450 minutes. The autoclave was vented at 79.8 psi (0.55 GPa) yielding 32.7% polymer solids in water.

EXAMPLE 2

Preparation of Fluoropolymer Dispersion CTFE, VDF and 2-Hydroxyethylacrylate, A Cure Site Provider This example and the next three that follow are directed to the preparation of fluoropolymer dispersions that may have application in paints, coatings, and varnishes. This experiment was conducted using the procedure outlined in Example 1 above. After consumption of the second charge of monomer an additional charge of 0.4 g iron (II) sulfate heptahydrate diluted to 20 ml with DI water was added. Consumption of the 3rd and 4th charges of monomer was conducted at 80C. A 200 ml solution consisting of 17 g 2-hydroxyethylacrylate (HEA), 0.5 g Triton 15-S-15, and deionized water, was added to the autoclave at a rate proportionate to the rate of consumption of the monomers. 30 weight percent polymer solids in water was obtained.

EXAMPLE 3

Preparation of Fluoropolymer Dispersion Containing Only CTFE and VDF No Surfact or Cure Site Provider The procedure of example 1 was followed with the following modifications. 23 g of a 20% solution of ammonium perfluorinated octanoate was charged over a two minute period at the beginning of the Continuous Charge of polymerization initiator. No cure site provider or other additives were charged to the autoclave. Polymerization time was 240 minutes yielding 38% polymer solids in water. The dispersion from example 3 was formulated into an overprint varnish which is disclosed in Example 16.

EXAMPLE 4

Preparation of Fluoropolymer Dispersion of CTFE, VDF and 3-Hydroxypropylacrylate, A Cure Site Provider, and a Polymerizable Surfactant A 38 liter stainless steel autoclave is charged with 18.9 L of deionized water then nitrogen sparged. After the autoclave is sealed, it is pressurized with 3.0 Kg of CTFE and 0.19 Kg VF2. The temperature is then raised to 46C, yielding a pressure of 1.35 GPa.

Over a ten minute period, two separate streams of redox catalysts are injected separately into the autoclave: (1a) 15.54 g MBS and 6.75 g iron (II) sulfate heptahydrate diluted to 100 ml with DI, deoxygenated water; and (2a) 20.36 g of a 70% TBHP solution diluted to 100 ml with DI, deoxygenated water. After the injection of the initial charge of catalysts, a solution of 317 g of perfluorinated ammonium octanoate (20% surfactant) was injected over a two minute period into the autoclave to further manipulate particle size. After the 10 minute period of injecting redox catalyst, additional redox catalyst is then injected over a six hour period at 0.33 ml/min: (1b) 47.3 g MBS diluted to 500 ml with DI water; and (2b) 62.1 g of a 70% solution (aq) diluted to 100 ml.

Additional CTFE and VDF is added in a continuous fashion to maintain a pressure of approximately 1.17 GPa. After 204 minutes, 10.6 Kg of CTFE and 0.51 Kg of VDF had been added, yielding a pressure of 0.48 Gpa. 1.7 Kg of CTFE and 1.7 Kg of VDF was then polymerized in a similar fashion while a solution of 240 g HPA and 13.5 g sodium-1-allyloxy-2-hydroxypropylsulfonate in a 1 L aqueous solution was added in a continuous fashion at a rate proportionate to the rate of consumption of the fluoroolefins. Additional redox catalyst was used at the same rate and concentration as needed. The polymerization was vented at 0.59 GPa (459 min), degassed, yielding 29.3 L of polymer latex having 40% polymer solids. A bimodal distribution was obtained having an overall particle size of 0.05 microns. Chlorotrifluoroethylene has a theoretical fluorine content of 49%. Dried polymer from this experiment contained 45% fluorine. The latex was 28% crystalline by X-Ray diffraction and had an average crystallite size of 66 angstroms. DSC analysis of a dried sample revealed a weak melting point at 170C and a glass transition at 38C (10C/min). This example demonstrates that by using the process of the invention, semicrystalline compositions can be obtained which coalesce at room temperature into a continuous films whereas analogous CTFE/VDF polymer compositions, containing both higher and lower levels of crystallinity, higher and lower levels of homogeneously incorporated VDF, do not, as shown in Comparative Example 1. The fluoropolymer dispersion of Example 4 was formulated into floor polished, as described in Example 17.

EXAMPLE 5

Preparation of a Fluoropolymer Dispersion of CTFE, VDF, a Vinyl Ester, and 3-Hydroxypropylacrylate, A Cure Site Provider This experiment was conducted using the procedure outlined in Example 1 above, with the monomer charges as shown in Table 1. Fluorine analysis yielded 46% fluorine. Dispersion obtained from Example 9 was further analyzed by X-Ray diffraction using an Inel Curved Position Sensitive detector and the SHADOW peak fitting program after the baseline subtraction of water. The latex was 25% crystalline and had an average crystallite size of 65 angstroms. Analysis of a dried sample of Example 9 using a Seiko Instrument RDC-T220 at 10° C./minute showed a distinct glass transition during the first cooling at 21.6° C. A very weak, broad melting point was observed at 110.1° C. Subsequent heating and cooling scans between 200° C. and −30° C. showed no melting point, while the glass transition ranged from 21–29° C. This demonstrates that the overall composition of the polymer is more amorphous than crystalline, with the crystallinity being confined to small domains (65 angstrom average crystallite size).

EXAMPLES 6–9

Preparation of Other Fluoropolymer Dispersions

The experiment outlined in Example 1 above is repeated using each of the monomeric groupings reported in Table 2 below.

TABLE 1

| Example | Monomer Charges 1 & 2 CTFE | VDF | 3rd, 4th Monomer Charges + Additives CTFE | VDF | X' | Time (min) | Total Molar ratios CTFE/VDF/Others |
|---|---|---|---|---|---|---|---|
| 1 | (1)235 (2)235 | (1)15 (2)15 | (3)126 (4)63 | (3)126 (4)63 | (3 + 4)9.3 AA, 0.5 EO | 450 | 43.7/26.3/1.0 |
| 2 | As in example 1 | | As in example 1 | | (3 + 4)17 HEA, 0.5 EO | 365 | 38.9/23.4/1.0 |
| 3 | (1)300 (2)300 | (1)14 (2)14 | (3)300 (4)175 | (3)14 (4)75 | | 240 | 39.8/18.8/1.0 5.0/1 |
| 4 | as described in text | | | | | 459 | 51.3/16.8/1 (HPA) |

TABLE 1-continued

| | Monomer Charges 1 & 2 | | 3rd, 4th Monomer Charges + Additives | | | Time | Total Molar ratios |
|---|---|---|---|---|---|---|---|
| Example | CTFE | VDF | CTFE | VDF | X' | (min) | CTFE/VDF/Others |
| 5 | 1(1,2,&3) each 300 CTFE, 16 VDF | | (2 + 3)4 AMP (4)120 | (4)70 | 18 HPA, 24 Ve10 24 VP, 2 AS | 472 | 63.7/13.3/1.0 (HPA)/ 1.7(VP)/0.88 VE |

AMPsodium 2-acrylamido-2-methyl-1-propane sulfonate; AA = acrylic acid; HEA = 2-hydroxyethylacrylate
EO = secondary alcohol ethoxylate non ionic surfactant-Tergitol 15-S-12 (Union Carbide, Inc.)
AS = anionic surfactant sodium lauryl ether sulfate (Rhone-Poulenc); HPA = 3-hydroxypropylacrylate
VP = vinylpropionate; VE10 = vinylester of Versatic 10, saturated monocarboxylic acid(Shell Chemical Co)

TABLE 2

| Example | Monomer Charges 1 & 2 | 3rd, 4th Monomer Charges + Additives |
|---|---|---|
| 6 | (1) 270 TFE, 30 HFP (2) 270 TFE, 30 HFP | (3) 270 TFE, 30 HFP (4) 175 VDF, 75 HFP, 15 g acrylic acid |
| 7 | (1) 270 TFE, 30 P (2) 270 TFE, 30 P | (3) 270 TFE, 30 propylene (4) 1 50 TFE, 50 HFP, 50 VDF |
| 8 | (1) 270 E, 15 P 20 VDF; (2) as in (1) | (3) as in (1) (4) 150 CTFE and 100 vinyl caproate, 20 HPA |
| 9 | (1) 260 TFE, 20 HFP, 10 VDF; (2) as in 1 | (3) as in 1 (4) 125 ethylene and 125 propylene, 15 g methacrylic acid |

E = ethylene; P = propylene

EXAMPLES 10 AND 11
Preparation of Fluoropolymer Dispersions Containing CTFE, VDF and Vinylacetic Acid or Itaconic Acid Cure Site Provider Without Surfactant These experiments were conducted using the procedure outlined in Example 1 above. The amount of reactants and processing conditions are reported in Table 3. The resulting dispersions were formulated as described in Examples 18–22 below and cast into films. These films were tested for tensile properties and abrasion resistance. The results are reported in Table 4.

EXAMPLES 12 AND 13
Preparation of Fluoropolymer Dispersions Containing CTFE, VDF, Vinyl Acetic Acid Cure Site Provider These experiments were conducted using the procedure outlined in Example 1 above. The amount of reactants and processing conditions are reported in Table 3. The resulting dispersions were formulated as described in Examples 18–22 below and cast into films. These films were tested for tensile properties and abrasion resistance. The results are reported in Table 4.

EXAMPLES 14 AND 15

Preparation of Fluoropolymer Dispersions Containing CTFE, VDF, Vinyl Acetic Acid, the Cure Site Provider, and a Polymer Crosslinking Agent The experiment was conducted using the procedures outlined in Example, except that in Example 14 within about 5 minutes of injecting the Continuous Charge, 10 ml of an 8 carbon alkyl lithium sulfonate fluorosurfactant available from Minnesota Mineral and Mining Co. under the tradename "FC-94" was added to the autoclave in order to generate a bimodal distribution of emulsion particles. In addition, 8 ml of a allylmethacrylate cross-linking agent was continuously added simultaneously with the consumption of the first and second monomer charges. In Example 15, no surfactant was used but 2 grams of 1,7-octadiene was used as a crosslinker for the first copolymer. The amount of reactants and processing conditions are reported in Table 3. The resulting dispersions were formulated as described in Examples 18–22 below and cast into films. These films were tested for tensile properties and abrasion resistance. The results are reported in Table 4.

TABLE 3

| | Monomer Charges 1 & 2 (g) | | | Monomer Charges 3 & 4 (g) | | | Time | % |
|---|---|---|---|---|---|---|---|---|
| Example | CTFE | VF2 | X | CTFE | VF2 | X | (min) | solids |
| (10) | 227 | 23 | — | 63 | 63 | 5.0 ITA | 555 | 33 |
| (11) | 227 | 23 | — | 63 | 63 | 15 VAA | 360 | 39 |
| (12) | (1)235 (2)240 | (1)15 (2)10 | — | 63 | 63 | (3)10 VAA; (4)2.0 AMPS | 480 | 29 |
| (13) | 235 | 15 | — | (3)87; (4)100 | (3)38 (4)25 | 11 VAA | 495 | 30 |
| (14) | (1)188 (2)291 | (1)12 (2)10 | (1,2) 8.0 AM | (3)88 (4)88 | (3)45 (4)44 | 2.0 AMPS; 15 VAA | 920 | 33 |

TABLE 3-continued

| Example | Monomer Charges 1 & 2 (g) | | | Monomer Charges 3 & 4 (g) | | | Time (min) | % solids |
|---|---|---|---|---|---|---|---|---|
| | CTFE | VF2 | X | CTFE | VF2 | X | | |
| (15) | (1)188 (2)288 | (1)12 (2)12 | (1,2) 2.0* OD | (3)88 (4)100 | (3)38 (4)25 | 15 VAA | 736 | 26 |

AM = allylmethacrylate; OD = 1,7-octadiene; ITA = itaconic acid; VAA = vinylacetic acid; AMPS = 2-acrylamide-2-methylpropane-1-sulfonic acid

EXAMPLE 16

Preparation of an Overprint Varnish Using Fluoropolymer Dispersion from Example 3

12 parts Joncryl 77 (acrylic polymer emulsion from S. C. Johnson & Son, Inc.), 53 parts Joncryl 74 (an acrylic polymer emulsion), 20 parts Joncryl 61 (an acrylic/styrene copolymer emulsion), and 24 g water were mixed together and cast on Lanetta sheets. This served as a control. To a separate identical solution was added 20.6 parts of the fluoropolymer dispersion of Example 3. This mixture was then cast on Lanetta sheets in the same method used for the control. The overprint varnish formulated with the fluoropolymer dispersion showed improved dry rub resistance (scuff and abrasion) as measured using a Sutherland Rub Tester and a reduction in coefficient of friction [0.55 (control) and 0.52 (with dispersion of invention)].

EXAMPLE 17

Preparation of a Floor Polish Using Fluoropolymer Dispersion from Example 4

A floor polish was formulated using 72.5 parts of a high molecular weight styrene/acrylic acid/acrylate acrylic latex complexed with zinc, 4.5 parts of an alkali soluble resin (partial or half esters of maleic graft on rosin), 6.8 parts of a low molecular weight, low density ethylene/acrylic acid copolymer (A-C® 540 copolymer from AlliedSignal Inc.), 6.8 parts of a low molecular weight high density oxidized polyethylene (A-C 325 polyetheylene from AlliedSignal Inc.), 1.2 part tributoxy ethyl phosphate, 1.2 part dibutylphthlate, 6.3 parts of a glycol ether, 0.58 fluorocarbon surfactant, 0.02 parts defoamer, 3 parts of this formulation was mixed to 1 part of the aquous dispersion produced in Example 4, and a cast on glass.

EXAMPLES 18–22

Preparation of Clear Continuous Films by Formulating the Dispersions into a Coating Formulation The dispersions of Examples 10–15 were formulated and cast into films in the manner described below (except as otherwise expressly noted) and the mechanical properties of the films were evaluated. 14.55 g of Triton XL-80N was added to 600 g of the fluoropolymer dispersion produced in Example 11. After initially adjusting the pH of the dispersion to 3.0 with NaOH, 200 ml of the pH adjusted dispersion was adjusted to pH 9.0 with NH$_4$OH. 0.85 g of a trifunctional aziridine available from Sybron Chemicals Inc. under the tradename "PFAZ-322", which had been previously dispersed in 10 ml of cold DI water was then added to the pH adjusted dispersion. 100 ml of the resulting formulated latex was then spread onto a 8"×8" polycarbonate tray lined with PTFE release film and allowed to dry at room temperature into a continuous film. The mechanical properties of the resulting film are summarized in Table 4.

The dispersion of Example 13 was formulated in the manner described above except that to 500 g of the pH adjusted dispersion was added 4.64 g Triton XL-80N, 18 g of di(ethyleneglycol) ethyl ether acetate, and a crosslinking agent shown in Table 4. The dispersion of Example 15 was also formulated in the manner described above except that to a 200 g the pH adjusted dispersion was added 1.55 g Triton XL-80N, 3.1 g di(ethyleneglycol)ethyl ether acetate, and the crosslinking agent shown in Table 4.

Examples 18 and 19 show that the flexibility of the film produced and the elongation at break, can be varied by the choice of the hydrophilic functional olefin. Example 20 demonstrates that the dispersions can be cured at room temperature with both organic curing agents, and inorganic curing agents typically used in floor polishes. Example 21 shows that even samples which have as little as 20 weight percent VDF in the second copolymer (total of 12 weight percent of VDF in the polymer) coalesce at room temperature into a continuous film. The films obtained in Example 22 which contained a crosslinking agent in the first copolymer show a significant reduction in the elongation at break and an increase in the tensile modulus.

TABLE 4

| Dispersion used in Example (Formulated Example) | Type of Crosslinking Agent (g) | $\sigma_b$ (psi) | E (psi) | $e_b$ (%) | Taber Abrasion loss (mg)[2] |
|---|---|---|---|---|---|
| 10 (18) | PFAZ-322 (0.29) | 463 | 3,014 | 468 | 0.184 |
| 11 (19) | PFAZ-322 (1.28) | 826 | 2,477 | 230 | 0.088 |
| 12 (20) | PFAZ-322 (1.06) | 1,455 | 16,145 | 79 | 0.096 |
| 12 (20) | Bacote 20 (2.40) | 689 | 9,645 | 209 | 0.186 |
| 12 (20) | ZnO$_2$ (1.80)[1] | — | — | — | 0.162 |
| 13 (21) | PFAZ-322 (2.77) | 1,748 | 9,924 | 108 | — |
| 13 (21) | Bacote 20 (6.83) | 610 | 5,678 | 252 | — |
| 15 (22) | PFAZ-322 (1.32) | 959 | 14,529 | 33 | — |

TABLE 4-continued

| Dispersion used in Example (Formulated Example) | Type of Crosslinking Agent (g) | $\sigma_b$ (psi) | E (psi) | $e_b$ (%) | Taber Abrasion loss (mg)[2] |
|---|---|---|---|---|---|
| 15 (22) | Bacote 20 (5.95) | 600 | 13,109 | 15 | — |

[1]Available from S.C. Johnson & Son, Inc. (Zinc Oxide Solution #1)
[2]Abrasion disc CS-17, 1 Kg load, 3000 revolutions (ASTM-D4060-90))
($\sigma_b$) = tensile strength at break; ($e_b$) = elongation at break; (E) = tensile modulus
Tensile properties of samples (1" × 0.58" × 0.17") were evaluated using a crosshead speed of 1 inch/minute on an Instron Testing machine, Model No. 4502.

COMPARATIVE EXAMPLE 1

Preparation of Semicrystalline CTFE/VDF Copolymer Containing No 2nd (Amorphous) Copolymer Structure 5 gallons (19 L) of DI water was charged into a ten (38 L) glass-lined autoclave, which was then sparged with $N_2$ for one hour. The autoclave was then charged with $N_2$ to 100 psig (0.68 GPa) and vented; this procedure was repeated 7 times.

After adding 1.7 kg of CTFE and 300 g VDF thereto, the autoclave was heated to 42.2° C., yielding a pressure of 181.9 psig (1.23 GPa). Two independent initial streams of redox initiator were simultaneously added to the autoclave over a period of 13 minutes at a rate of 7.7 ml/min: 20.26 g of t-BHP diluted to 100 ml with DI water; and 15.54 g of MBS and 2.26 g of ferrous sulfate heptahydrate diluted to 100 ml with DI water.

After the addition of the initial charge of redox initiator, two independent streams of a continuous charge of redox initiator was supplied simultaneously to the autoclave at a rate of 1.38 ml/min over a period of 360 minutes: 72.71 g t-BHP diluted to 500 ml with DI water; and 55.51 g of MBS diluted to 500 ml with DI water.

After the consumption of the first monomer charge, CTFE and VDF were charged continuously into the autoclave at a rate of 17 g/min to maintain a pressure therein of about 170 to about 180 psig (about 1.15 GPa to about 1.22 GPa), using a continuous stream of 15% VDF in the fluoroolefin mixture. Approximately 6 hours later, the autoclave was vented after reaching 48.9 psig (0.33 GPa). Overall 13.18 Kg of CTFE and 2.33 Kg of VDF were added to the autoclave during the course of the polymerization to product approximately 7 gallons (27 L) of latex having 41% solids.

1.49 g of the surfactant of Example 15 were added to 49.2 g of the resulting latex. The formulated fluoropolymer latex was spread onto a polyethylene terephthalate ("PET") film using a Gardner film casting knife, yielding a wet thickness of 8 mil. The temperature of the film was controlled by a heating block containing steam heating coils on one end and a dry ice reservoir on the other, such that a temperature gradient from 20° C. to about 80° C. across the film was maintained. Regardless of the temperature selected in this range, the resulting dry film cracked, was cloudy, and discontinuous.

This drying procedure was repeated with other latex samples containing lower percentages of VDF which had also been homogeneously incorporated into the polymer and none formed continuous films at temperatures less than 100° C.

In comparison to Example 22, which disclosed a room temperature coalescable fluoropolymer composition containing 12% VDF, this Example shows that fluoropolymer dispersions having no second (amorphous) copolymer, which have homogeneously incorporated quantities of 15% or less VDF, do not coalesce into continuous films at temperatures less than 80° C. X-Ray diffraction analysis of this sample showed only 6% crystallinity and an average crystallite size which could not be calculated. Using differential scanning calorimetry, no melting point could be detected. This example shows that in the absence of the first and second copolymer process, the sequential polymerization of an amorphous polymer composition with a semicrystalline composition, room temperature coalescence can not be obtained. Although the samples disclosed in the present invention have low crystallinity (25–30%), they coalesce at room temperature whereas a sample prepared having a constant polymer composition which is almost completely amorphous does not. Similar homogenous samples, having vinylidene fluoride contents from 1–12% based on a VDF/CTFE copolymer, completely cracked at 80° C. into white discontinuous fragments. CTFE/VDF copolymers having a range of homogeneously incorporated VDF from 4%–15%, having a range of crystallinity from 6–42%, all do not coalesce at room temperature whereas the semicrystalline fluoropolymer composition of the present invention do.

What is claimed is:
1. A process comprising:
   a) reacting, in the presence of a radical initiator,
      1) at least two comonomer units of the formula

      $CX_2CYA$ wherein
      X is independently selected from H, Cl, or F;
      Y is H, Cl, F, $O(CZ_2)_nCZ_3$, $(CZ_2)_nCZ_3$, $(OCZ_2CZ_2)_nCZ_3$ or $(O(CZ_2)_n)_nCZ_3$ wherein n is from about 1 to about 12;
      Z is independently selected from H or F;
      A is H, Cl, or F;
      the first copolymer contains at least about 4 weight percent of each of the comonomer units;
      at least one of the said comonomer units contains a fluorine atom;
      under conditions sufficient to form a semicrystalline first copolymer;
   b) reacting, in the presence of said first copolymer, water, a radical initiator and at least one cure site provider, at least two comonomer units of the formula:

      $CX_2CYB$ wherein
      X and Y are as defined above;
      B is H, Cl, F or —OCOR wherein R is a linear or branched aliphatic hydrocarbon of from 1 to 20 carbons;
      at least one of said comonomer units contains a fluorine atom;
      under conditions sufficient to form a semi-crystalline polymeric composition.

2. The process of claim 1 wherein said radical initiator is selected for the group consisting of: thermal initiators and redox initiators.

3. The process of claim 2 wherein said radical initiator is a redox initiator.

4. The process of claim 3 wherein said radical initiator comprises a sodium meta bisulfite reducing agent and a t-butylhydroperoxide oxidizing agent.

5. The process of claim 2 wherein said initiator is present an amount of from about 10 to about 100,000 ppm.

6. The process of claim 2 wherein said process is conducted in the presence of an accelerator.

7. The process of claim 6 wherein said accelerator is a transition metal.

8. The process of claim 2 wherein said process is conducted in the presence of a secondary radical initiator.

9. The process of claim 8 wherein said secondary initiator is a peroxide.

10. The process of claim 1 wherein said process is conducted in the presence of a surfactant.

11. The process of claim 10 wherein said surfactant is a perfluorinated anionic surfactant.

12. The process of claim 1 wherein the first copolymer comprises monomers of the formula:

$CX_2CYA$ wherein:

X is independently selected from H, Cl, or F;

Y is H, Cl, F, $O(CZ_2)_nCZ_3$, $(CZ_2)_nCZ_3$, $(OCZ_2CZ_2)_nCZ_3$, or $(O(CZ_2)_n)_nCZ_3$ wherein n is from about 1 to about 12;

Z is independently selected from H or F; and

A is H, Cl, or F;

excluding monomers in which each X and A are hydrogen and monomers containing more than one chlorine atom.

13. The process of claim 1 wherein the first copolymer comprises monomers selected from the group consisting of: olefins of from 1 to about 15 carbon atoms, partially and perfluorinated olefins of from 1 to about 15 carbon atoms, vinyl esters of from about 1 to about 15 carbon atoms and perfluoroethers of from about 1 to about 15 carbon atoms.

14. The process of claim 1 wherein said first copolymer comprises monomers selected from the group consisting of: chlorotrifluoroethylene, vinylidene fluoride, tetrafluoroethylene, hexafluoropropene, 1,2-difluoroethylene, 1,2-chlorodifluoroethylene, 1-chloro-1-fluoroethylene, perfluoro(propyl vinyl ether), perfluoro(1,3-dioxole), perfluoro(2,2-dimethyl-1,3-dioxole), ethylene, propylene, isobutylene, and vinylpropionate.

15. The process of claim 1 wherein said first copolymer comprises chlorotrifluoroethylene and vinylidene fluoride.

16. The process of claim 1 wherein said second copolymer comprises monomers of the formula:

$CX_2CYA$ wherein:

X is independently selected from H, Cl, or F;

Y is H, Cl, F, $O(CZ_2)_nCZ_3$, $(CZ_2)_nCZ_3$, $(OCZ_2CZ_2)_nCZ_3$, or $(O(CZ_2)_n)_nCZ_3$ wherein n is from about 1 to about 12;

Z is independently selected from H or F;

A is H, Cl, or F;

excluding monomers in which each X and A are hydrogen and monomers containing more than one chlorine atom.

17. The process of claim 1 wherein the second copolymer comprises monomers selected from the group consisting of: olefins of from 1 to about 15 carbon atoms, partially and perfluorinated olefins of from 1 to about 15 carbon atoms; vinyl esters of from about 1 to about 15 carbon atoms and perfluoroethers of from about 1 to about 15 carbon atoms.

18. The process of claim 1 wherein said second copolymer comprises monomers selected from the group consisting of: chlorotrifluoroethylene, vinylidene fluoride, tetrafluoroethylene, hexafluoropropene, 1,2-difluoroethylene, 1,2-chlorodifluoroethylene, 1-chloro-1-fluoroethylene, perfluoro(propyl vinyl ether), perfluoro(1,3-dioxole), perfluoro(2,2-dimethyl-1,3-dioxole), ethylene, propylene, isobutylene, and vinylpropionate.

19. A coating composition comprising a fluoropolymer composition and a curing agent, the fluoropolymer composition comprising an aqueous dispersion of particles, which particles comprise a semi-crystalline first copolymer enveloped by an amorphous second copolymer wherein:

a) the semi-crystalline first copolymer has at least two comonomer units of the formula:

$CX_2CYA$ wherein

X is independently selected from H, Cl, or F,

Y is H, Cl, F, $O(CZ_2)_nCZ_3$, $(CZ_2)_nCZ_3$, $(OCZ_2CZ_2)_nCZ_3$, or $(O(CZ_2)_n)_nCZ_3$ wherein n is from about 1 to about 12;

Z is independently selected from H or F;

A is H, Cl, or F;

the first copolymer contains at least about 4 weight percent of each of the comonomer units; and at least one of the first comonomer units contains a fluorine atom; and b) the amorphous second copolymer is the reaction product of a cure site provider and at least two comonomer units of the formula:

$CX_2CYB$ wherein

X and Y are as defined above;

B is H, Cl, F or —OCOR; wherein R is a linear or branched aliphatic hydrocarbon of from 1 to 20 carbons; and at least one of said comonomer units contains a fluorine atom.

20. The composition of claim 19 wherein said curing agent is selected from the group consisting of: isocyanates, blocked isocyanates, polyisocyanates, biurets, uretidiones; amino resins, acid anhydrides, polysilanes, blocked silanes, polyfunctional aziridine, aliphatic and aromatic carbodiimides; polyepoxy compounds; isocyanate-containing silane compounds; hydroxylamines, and copolymers and mixtures thereof.

21. The composition of claim 19 further comprising a polyacrylate.

* * * * *

UNITED STATES PATENT AND TRADEMARK OFFICE
CERTIFICATE OF CORRECTION

PATENT NO. : 6,140,408
DATED : October 31, 2000
INVENTOR(S) : T.f. McCarthy et al.

It is certified that error appears in the above-indentified patent and that said Letters Patent is hereby corrected as shown below:

On the title page item [73] Assignee: AlliedSignalInc., Morristown, NJ

Signed and Sealed this

Tenth Day of April, 2001

Attest:

NICHOLAS P. GODICI

Attesting Officer

Acting Director of the United States Patent and Trademark Office